Figure 1:
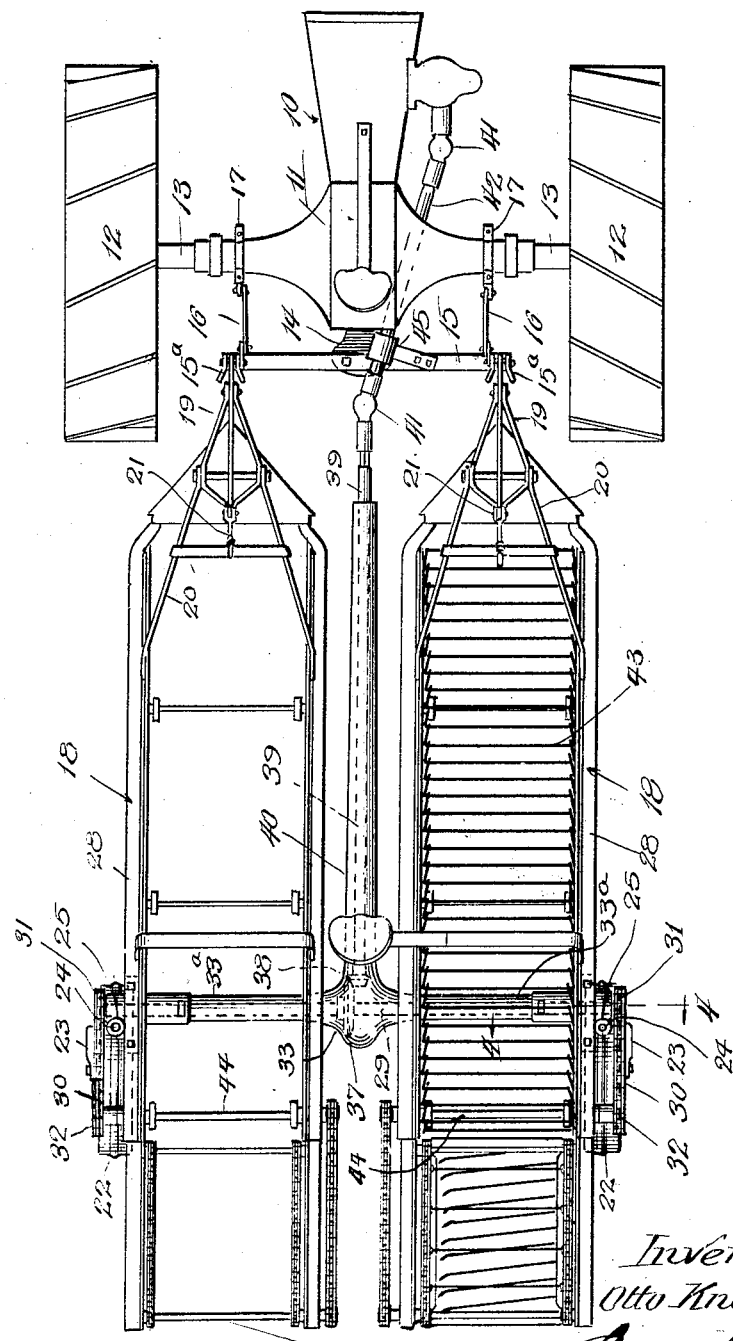

Nov. 29, 1927.

O. KNOERZER 1,650,991

TRACTOR DRIVEN POTATO DIGGER

Filed Jan. 24, 1927

2 Sheets-Sheet 1

Inventor:
Otto Knoerzer,
by Charles O. Shurvey,
his Atty.

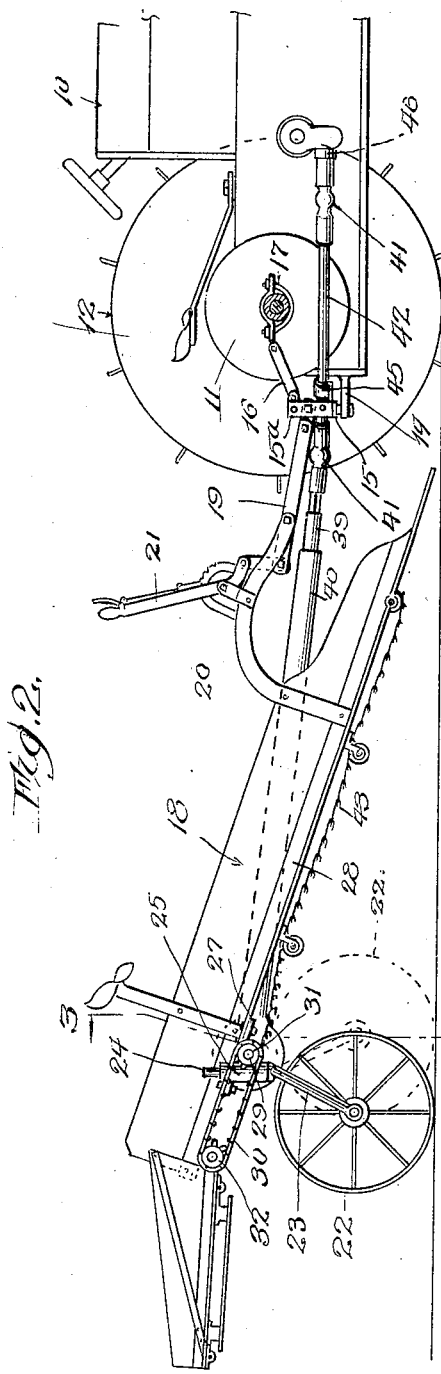
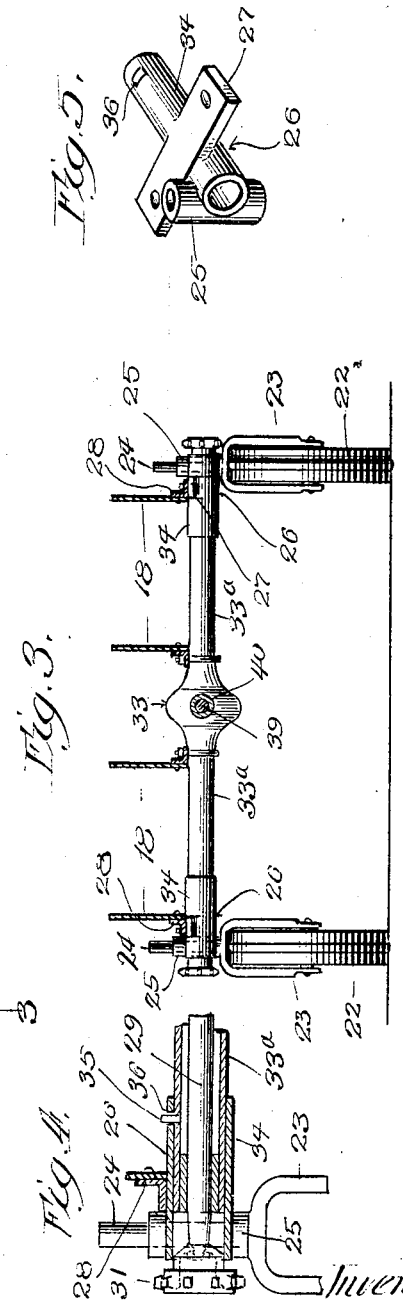

Patented Nov. 29, 1927.

1,650,991

UNITED STATES PATENT OFFICE.

OTTO KNOERZER, OF HAMMOND, INDIANA.

TRACTOR-DRIVEN POTATO DIGGER.

Application filed January 24, 1927. Serial No. 163,057.

This invention relates to agricultural implements, and more particularly to tractor driven implements, such as potato diggers. The principal object of the present invention is to provide a tractor driven potato digger, which may be used with the same advantages that horse drawn diggers are used. With the potato diggers now on the market considerable difficulty is experienced in harvesting the field at places close to the ends thereof because of the difficulty of turning the tractor and potato digger around. Furthermore it is highly desirable to employ a tractor for drawing potato diggers, but standard tractors as well as others do not have a wide wheel gauge whereby the wheels may run between the rows of plants. One of the objects of the present invention is to provide rigid connections between a tractor and a pair of potato diggers whereby two rows of crops may be harvested at the same time. Another object is to provide connecting means between the tractor and potato diggers whereby the latter may be readily moved about, either by drawing them forward, turning them around, or backing them up, so that the potato diggers may be brought into position at the extreme end of the field to thereby enable the entire field to be worked.

With these ends in view, this invention consists in a rigid connecting means between a double row farming implement and a tractor whereby the implement may be moved around as though it were part of the tractor structure. The invention further consists in a double row farming implement having a rigid connection with the tractor at one end and supported by caster wheels at the other end whereby it may be moved forward or backward or swung around sideways. The invention further consists in a double row potato digger rigidly connected to a tractor and having its working elements operatively connected to a drive shaft of the tractor. The invention further consists in the several novel features hereinafter fully set forth and claimed.

The invention is clearly illustrated in the drawings accompanying this specification, in which:

Fig. 1 is a plan of a tractor driven potato digger embodying a simple form of the present invention and showing the same connected to a tractor, part of the tractor being broken away; Fig. 2 is a side elevation of the parts seen in Fig. 1 with one of the traction wheels removed; Fig. 3 is a vertical cross section taken on the line 3—3 of Fig. 2; Fig. 4 is a detail vertical cross section taken on the line 4—4 of Fig. 1 and Fig. 5 is a perspective view of a supporting bracket which forms part of the invention.

Referring to said drawings, the reference character 10 designates a tractor, 11 its rear axle and 12 its traction wheels. In the present instance the traction wheels are mounted upon axle extensions 13 whereby the gauge of the traction wheels is increased to enable the tractor to travel between the rows of growing crops. The axle extension means is more clearly shown and described in my co-pending application filed August 16, 1926, Serial No. 129,345 for means for converting standard tractors into tractors for working rows of crops. A double row potato digger unit is illustrated in the drawings and is shown as connected to the coupling member 14 of the tractor by a cross bar 15. Near its ends the cross bar 15 is connected to the rear axle of the tractor by brace rods 16, which as shown are fastened to the axle by U bolts 17.

The two potato diggers 18 are similar in construction and a conventional form thereof is illustrated. Much of their working elements is omitted from the drawings, but their construction and arrangement is common and well known to those skilled in the art to which this invention pertains. The two potato diggers are spaced far enough apart to dig two rows of growing crops, and each digger is connected to the cross bar 15 by link mechanism 19, an arch bar 20, and a raising and lowering lever 21, although the exact form of connection is immaterial to the invention broadly considered. As shown the link mechanism 19 is pivotally connected to upright members 15ª secured at the ends of the cross bar 15. It will be obvious, that while the potato diggers are rigidly connected to the tractor, so far as any lateral play is concerned, they may be tilted more or less by properly manipulating the levers 21 so as to raise their forward ends above the ground and to depress them into position for digging the potatoes. The forward ends of the potato diggers are thus supported by the tractor and their rear ends are supported by caster wheels 22, there being one at each side of the machine and said caster wheels are journaled in forks 23, having upright stems 24 that are rotatively mounted in upright bearing members 25 formed on bearing brackets 26. The bearing brackets 26 are formed with other bearing members 34 and lugs or base members 27, which are bolted or otherwise secured to frame members 28 of the potato diggers. There are two bearing brackets 26, one located at the outer side of each potato digger.

The conveyor chains 43 of the potato diggers are driven from a shaft 29 by sprocket chains 30, which are trained over sprocket wheels 31, fast on the shaft 29, and over sprocket wheels 32 fast on the conveyor chain shafts 44 of the potato diggers.

The shaft 29 is contained in a housing 33, having end portions 33ª which are inserted into and contained in the bearing members 34, of the bearing brackets 26 and said housing 33 forms the connecting means between the rear ends of the two potato diggers 18. The potato diggers may swivel upon the end portions 33ª of said housing 33, but relative sidewise movement is prevented by connections between the housing and bearing brackets, which as shown comprise pins 35 secured in the housing portions 33ª and engaging in slots 36 formed in the members 34 of the bearing brackets 26.

The shaft 29 is driven from a power shaft of the tractor, and as shown said shaft 29 has a beveled gear wheel 37 thereon, which is contained in the housing 33 and meshes with a beveled pinion 38, which is fast on a shaft 39 that projects forward through an extension 40 of the housing 33 and is connected to the power shaft 46 of the tractor by universal connections 41 and a shaft 42. The forward end of the housing extension 40 and shaft 39 are carried by a bearing bracket 45 secured to the cross bar 15 and serving as a bearing for the shaft 42.

In operation, the tractor is driven through the field with the tractor wheels running in the rows between the plants, consequently the potato diggers are drawn through the hills and dig up the potatoes, which are lifted out of the ground and conveyed through the potato diggers by the conveyor chains, separated from the vines and delivered at the rear in a row midway between the two diggers as is well understood. At the end of the field the tractor may be turned around and backed up so as to bring the potato diggers at the very extreme end of the field, and this is made possible because of the rigid connection between the potato diggers and tractor, and the caster wheels, which support the free ends of the potato diggers. It will be observed that because of the rigid connection, the potato diggers may be swung about by the tractor as though they were a rigid portion thereof. Although the conveyor chains of the potato diggers are driven from a power shaft of the tractor, by mounting the potato digger frames on the end portions 33ª of the housing 33 in coaxial alignment with the shaft 29 which drives the conveyor chains, the front ends of the potato diggers, or either of them may be raised or lowered at will, without interfering with the operation of the drive mechanism.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. In a tractor driven double row potato digger, the combination with a tractor, of a pair of potato diggers supported at one end by caster wheel elements and each potato digger having a supporting and draught connection at its other end with the tractor, whereby it is maintained in longitudinal alignment therewith, each of said supporting and draught connections including a swiveled connection with the tractor, whereby either digger may be tilted more or less relative to the other.

2. In a tractor driven double row potato digger, the combination with a tractor having a power shaft, of a pair of connected together potato diggers supported at one end by caster wheel elements, and capable of being tilted upon said caster wheel elements, each potato digger having conveyor chain mechanism, a draught connection between said tractor and each potato digger whereby the tractor and potato diggers are maintained in longitudinal alignment, said draught connections including swivel connections whereby the potato diggers may be tilted relative to the tractor and to each other, and driving connections between the power shaft of the tractor and the conveyor chain mechanisms of the two potato diggers.

3. In a tractor driven, double row potato digger, the combination of a pair of potato diggers, caster wheel supporting elements for one end of said diggers and having bearing brackets secured to said diggers, a conveyor chain driving shaft mounted in said bearing brackets, driving connections between said shaft and a power shaft of the tractor, and a draught connection between both potato diggers and the tractor.

4. In a tractor driven, double row potato digger, the combination of a pair of potato diggers, arranged side by side and rigidly connected together against relative sidewise movement, caster wheel supporting elements supporting the rear ends of the diggers, a conveyor chain drive shaft extending from one digger to the other, drive connections between said shaft and a power shaft of the tractor, and a draught connection between said diggers and tractor.

5. In a tractor driven, double row potato digger, the combination of a pair of potato diggers, arranged side by side, caster wheel elements supporting the rear ends of said diggers, and having bearing brackets secured to the frames of the diggers, a housing rotatively mounted in said bearing brackets, a conveyor chain drive shaft contained in said housing, power transmitting connections between said shaft and a power shaft of the tractor, draught and supporting connections between the forward ends of said diggers and the tractor for maintaining said diggers in longitudinal alignment with the tractor, and including swivel connections for permitting the diggers to be tilted independently of each other.

6. In a tractor driven, double row potato digger, the combination of a pair of potato diggers, arranged side by side, caster wheel elements supporting the rear ends of said diggers, and having bearing brackets secured to the frames of the diggers, a housing rotatively mounted in said bearing brackets, a conveyor chain drive shaft contained in said housing, a drive shaft contained in said housing, gearing between said shafts, located in said housing, said drive shaft being operatively connected with a power shaft of the tractor, draught and supporting connections between the two diggers and tractor for maintaining said diggers in longitudinal alignment with the tractor, and including swivel connections for permitting the diggers to tilt relative to each other.

OTTO KNOERZER.